United States Patent [19]

Hensley, Jr. et al.

[11] Patent Number: 4,549,957
[45] Date of Patent: * Oct. 29, 1985

[54] HYDROTREATING CATALYST AND PROCESS

[75] Inventors: Albert L. Hensley, Jr., Munster, Ind.; Leonard M. Quick, Naperville, Ill.

[73] Assignee: Amoco Corporation, Chicago, Ill.

[ * ] Notice: The portion of the term of this patent subsequent to Sep. 30, 1997 has been disclaimed.

[21] Appl. No.: 506,293

[22] Filed: Jun. 21, 1983

Related U.S. Application Data

[62] Division of Ser. No. 274,500, Jun. 17, 1981.

[51] Int. Cl.$^4$ .................. C10G 45/08; C10G 45/20
[52] U.S. Cl. .................. 208/216 PP; 208/251 H
[58] Field of Search .............. 208/111, 112, 216 PP, 208/251 H

[56] References Cited

U.S. PATENT DOCUMENTS

| | | | |
|---|---|---|---|
| 3,887,455 | 6/1975 | Hamner et al. | 208/112 |
| 3,898,155 | 8/1975 | Wilson | 208/216 PP |
| 3,904,550 | 9/1975 | Pine | 208/138 X |
| 4,003,828 | 1/1977 | Eberly, Jr. | 208/251 H |
| 4,032,433 | 6/1977 | Petri et al. | 208/112 |
| 4,225,421 | 9/1980 | Hensley, Jr. et al. | 208/216 PP |
| 4,257,922 | 3/1981 | Kim et al. | 252/465 |
| 4,315,839 | 2/1982 | Bouge et al. | 252/448 |
| 4,395,329 | 7/1983 | Le Page et al. | 208/251 H |

*Primary Examiner*—D. E. Gantz
*Assistant Examiner*—O. Chaudhuri
*Attorney, Agent, or Firm*—James R. Henes; William T. McClain; William H. Magidson

[57] ABSTRACT

Hydrotreating catalysts comprise a hydrogenating component and a support comprising at least one porous refractory inorganic oxide, said catalyst having BET surface area of 150 to about 190 m$^2$/g, nitrogen desorption pore volume of 0.8 to about 1.2 cc/g in micropores with radii up to 600 Å, with at least 0.7 cc/g of such micropore volume in pores having radii ranging from 50 to 600 Å, mercury penetration pore volume of 0.1 to about 0.5 cc/g in macropores with radii of 600 to 25,000 Å and bulk density of about 0.3 to about 0.5 g/cc. Hydrotreating process comprises contacting a hydrocarbon feed susceptible to upgrading with hydrogen in the presence of the aforesaid catalysts under hydrotreating conditions. The catalyt and process are particularly useful in hydrotreating feeds comprising high metals or high metals and sulfur content materials.

12 Claims, 4 Drawing Figures

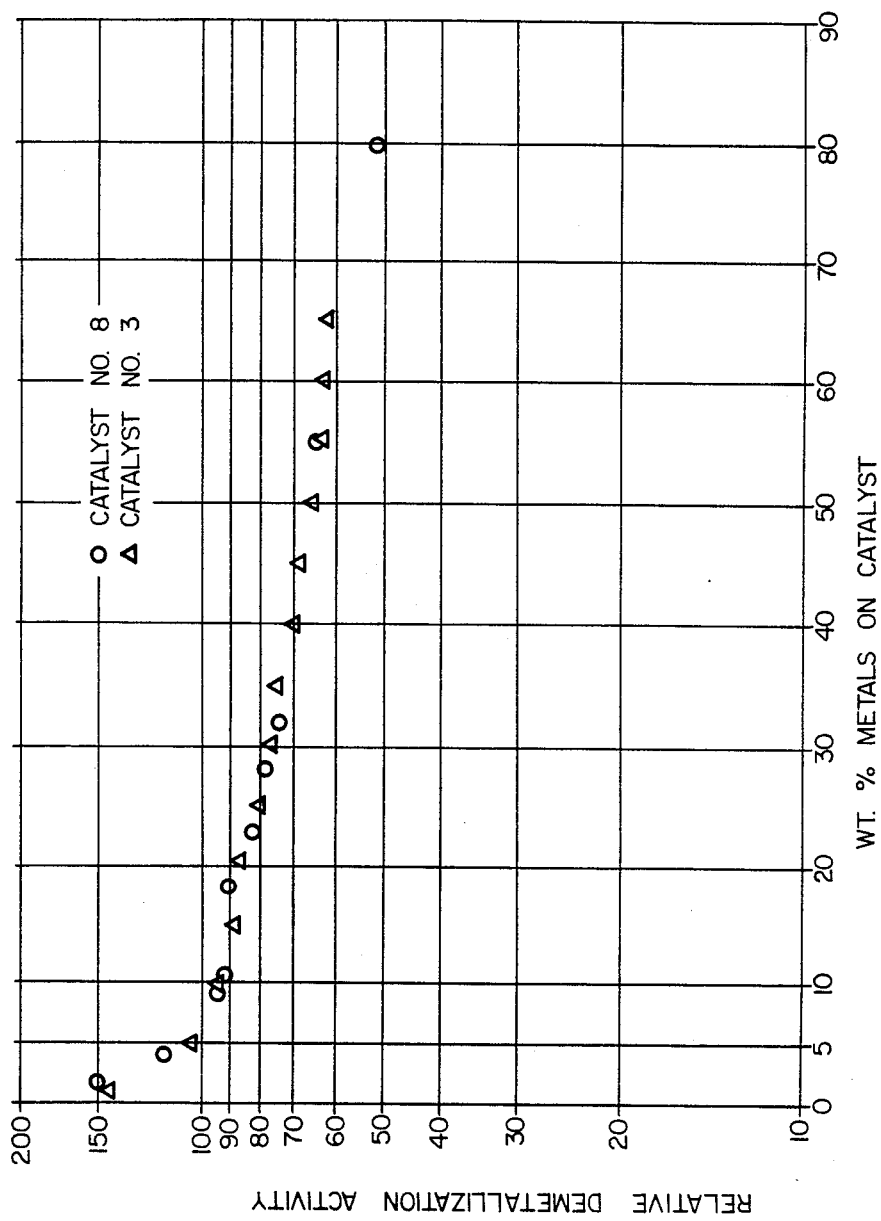

HYDROTREATING CATALYST AND PROCESS

This is a division, of application Ser. No. 274,500, filed June 17, 1981.

BACKGROUND OF THE INVENTION

This invention relates to upgrading of hydrocarbon feed materials by catalytic hydrotreating. More particularly, the invention relates to an improved catalyst and process for hydrodemetallation of heavy hydrocarbons.

Decreasing supplies of high quality crude oils have focused considerable attention on refining lower quality feeds in recent years. Among such materials are those such as medium and heavy petroleum distillate fractions, crude oil resids, whole shale oils, tar sand oils and fractions thereof that require upgrading, for example, from the standpoint of removing or reducing the content of sulfur, nitrogen and/or metals, to facilitate conversion to more useful products. Catalytic hydrotreating is a well known means for upgrading feeds in need thereof. Typically, a feed is contacted with hydrogen in the presence of catalyst under conditions that vary somewhat depending on factors such as the particular feed to be upgraded, the type of process being operated, reaction zone capacity and other factors known to persons skilled in the art.

In terms of general composition, hydrotreating catalysts typically comprise a hydrogenating component and a porous, refractory inorganic oxide support. Physical properties that are important from the standpoint of demetallation activity include surface area, pore volume and pore size distribution. General guidelines with respect to catalysts suitable for demetallation use are disclosed in U.S. Pat. No. 3,180,820 (Gleim et al.). In terms of composition, the catalysts of Gleim et al. comprise a metallic component having hydrogenating activity, e.g., a Group V, VI, iron group or platinum group metal component, composited with a refractory inorganic oxide having surface areas and pore volumes that can vary over wide ranges. Catalyst physical properties include surface areas of about 50–700 m$^2$/g, pore diameters of about 20–600 Å and pore volumes of 0.1–20 cc/g.

Lacking from the generalized teaching of Gleim et al. is a consideration of the interrelationships between and among physical properties and the effects thereof on catalyst performance. For example, the desirability of maximizing catalyst surface area and pore volume in order to provide high exposure of feed components to catalytically active sites, and thus, maximum activity, is well known. At the same time, however, if surface area and pore volume are too high, bulk density and mechanical strength of a catalyst can decrease to the point that use of the catalyst in hydrotreating processes is impractical or even impossible despite high activity. For example, in expanded bed processes, bulk density must be high enough to avoid substantial carryover of catalyst particles though not so high as to require unreasonably high space velocities to ensure adequate bed expansion. Of course in both expanded and fixed bed operations, it is desirable to maximize bulk density to the extent consistent with the aforesaid considerations in order to maximize catalyst loading and thereby maintain high productivity. Mechanical strength of catalyst particles is important from the standpoint of fixed bed use in that particles must be capable of withstanding the pressure drop through the bed. In expanded bed operations pressure drop through the catalyst bed is lower than in fixed bed processes; however, if catalyst particles do not exhibit sufficient crush strength and abrasion resistance collisions with each other and reactor internals can lead to excessive fragmentation of the particles and inferior performance.

Pore size distribution also influences both catalytic activity and suitability for process use. Subject to the aforesaid considerations with respect to bulk density and crush strength, it is desirable to provide catalyst particles having a high level of small or intermediate-sized pores because, for a given total pore volume, distribution thereof in many smaller pores gives higher surface area than distribution in a smaller number of larger pores. While smaller pores are thus desirable from the standpoint of maximizing surface area, such pores also are more susceptible to plugging than larger pores, and thus, if too many pores of too small size are present, demetallation activity often declines substantially during process use. If activity declines too rapidly, losses in productivity and/or increases in catalyst replacement costs are incurred.

From the foregoing, it can be appreciated that a balance must be struck between and among catalyst physical properties to ensure a desirable combination of activity, activity maintenance and suitability for process use. It is an object of this invention to provide a catalyst having such a desirable balance of properties. A further object of the invention is to provide an improved hydrotreating process using such catalyst. A more specific object is to provide an improved process for upgrading hydrocarbon feeds susceptible to upgrading in terms of reduction in metals content. Another object of the invention is to provide a catalyst useful for demetallation and desulfurization of hydrocarbon feeds containing high levels of contaminants. A further object is to provide an overall process for upgrading hydrocarbon feeds in need of upgrading wherein demetallation is conducted in the presence of the invented catalysts in a first zone and further hydrotreating is carried on in one or more subsequent zones with one or more other catalysts. Other objects of the invention will be apparent to persons skilled in the art from the following description and the appended claims.

We have now found that the objects of this invention can be attained by the provision of catalysts having a specific combination of surface area, pore volume, pore size distribution and bulk density tailored to provide high hydrotreating activity and exceptional activity maintenance along with a high degree of flexibility in terms of suitability for process use. In greater detail, the catalysts of this invention have moderate-to-high surface areas and pore volumes which, in conjunction with bimodal distribution of pore sizes and concentration of micropore volume in pores large enough to accommodate metals-containing components of hydrocarbon feeds, contribute to the superior activity and activity maintenance properties of the catalyst. In fact, the invented catalysts have the capacity to continue removing metals at metals loadings as high as 150–200% based upon catalyst weight. Further, depending on the choice of hydrogenating component, the catalysts can exhibit substantial desulfurization activity in addition to demetallation activity. Bulk density varies over a relatively narrow range which, at its upper end, is well suited for fixed bed use, while at its lower end, is well suited for expanded bed use. Throughout the range, bulk density is high enough to ensure economically acceptable catalyst loadings.

While not wishing to be bound by theory, it can be speculated that the physical properties of the invented catalysts are critical from the standpoint of demetallation performance in that the bimodal distribution of pores provides a high micropore volume that contributes to a surface area great enough to provide a high population of active sites available for catalyzing the reactions involved in demetallation, desulfurization and so forth. Concentration of micropore volume in pores large enough to accommodate metals-containing components of hydrocarbon feeds contributes to activity and maintenance of activity in that a high level of sites is provided in pores to which metals-containing components have access and plugging of pores is minimized. The bimodal pore size distribution of the invented catalysts also provides an appreciable level of macropores which serve as low surface area channels throughout the catalyst particles which facilitate rapid diffusion of reactants into the smaller pores where demetallation reactions occur. It can be theorized that without the macropore network, metal sulfides and/or coke would deposit rapidly in the smaller pores near the external surface of the catalyst particles. This, in turn, would result in pore mouth plugging and catalyst deactivation. The low surface area of the macropores of the invented catalysts limits the concentration of active sites to which reactants are exposed during passage through the macropore network such that reaction in macropores is limited and access to the smaller high surface area pores is maintained.

Proposals that may be of interest with respect to the present invention in disclosing attempts to provide hydrotreating catalysts having specific combinations of physical properties include U.S. Pat. No. 3,887,455 (Hamner et al.) which discloses particulate solids of "critical pre-selected pore size distribution, extremely low density, and ultra high porosity" for use in denitrogenation, desulfurization and demetallation of heavy crudes and resids, which particulate solids stratify during use in ebullated bed processes due to deposition of metals and/or coke so as to facilitate removal of spent solids. The particulate solids may be a catalyst comprising a hydrogenating component supported on an inorganic oxide. The particulate solids have at least about 50% of total pore volume in pores having radii of about 50 to about 150 Å, less than 20% of pore volume in pores having radii of 0-50 Å, surface area of at least about 200-600 $m^2/g$ and total pore volume of 0.8-3.0 cc/g. Catalyst density ranges from 0.25-0.7 g/cc depending largely on hydrogenating metal content. Example 1 of Hamner et al. illustrates stratification of a mixture of alumina pellets with catalysts having properties within the aforesaid ranges although no denitrogenation, desulfurization or demetallation results are reported. Examples 2 and 3 simulate use of the patentee's catalysts to reduce metals content of a heavy hydrocarbon feed from 480 ppm to 50 ppm in a first stage and from 50 ppm to less than 5 ppm in a second stage. Hamner et al. fails to disclose or suggest either the surface area or bimodal pore size distribution of the invented catalysts.

U.S. Pat. No. 3,876,523 (Rosinski et al.) discloses hydrodemetallation-hydrodesulfurization catalysts comprising a hydrogenating component composited with a refractory support and having a bimodal distribution of pores such that not less than 60% of pore volume is in pores of 50-100 Å radius and not less than about 5% of pore volume is in pores greater than 250 Å radius. Unlike the invented catalysts, those according to Rosinski et al. have surface areas of 40-150 $m^2/g$, preferably less than 110 $m^2/g$. Catalysts similar to those of Rosinski et al. are disclosed in U.S. Pat. No. 4,016,067 (Fischer et al.) and U.S. Pat. No. 4,082,695 (Rosinski et al.).

U.S. Pat. No. 3,898,155 (Wilson) discloses simultaneous demetallation and desulfurization of heavy oils using catalysts comprising a Group VIB metal and at least one Group VIII metal composited with an alumina support, such catalysts having a bimodal distribution of pores such that macropore (>300 Å pore radius) volume is 10-40% of total pore volume, micropore (0-300 Å pore radius) volume is 60-90% of total pore volume and at least 80% of such micropore volume is in pores having radii of at least 50 Å. According to Wilson's broad teaching, the disclosed catalysts have surface areas of at least 100 $m^2/g$, total pore volumes of at least 0.5 cc/g and average pore diameters of at least 100 Å calculated as 4 V/A. However, the highest total pore volume reported in the patentee's examples is 0.879 cc/g. In contrast, total pore volume of the invented catalysts is at least 0.9 cc/g and typical micropore (radii up to 600 Å) volume of the invented catalysts is greater than Wilson's total pore volume, though it is noted that a portion of Wilson's macropore radius range falls within the micropore range of the invented catalysts. Further, Wilson fails to disclose or suggest the invented catalysts' combination of surface area and bulk density.

U.S. Pat. No. 4,102,822 (Mulaskey) discloses hydrotreating catalysts comprising a rigidly interconnected pack of irregularly shaped particles of specified sizes. There is a bimodal distribution of pores in the pack, with access pores of 500-75,000 Å radii contributing at least about 3% of pore volume. Surface area of the disclosed catalysts ranges from 0.1 to above 500 $m^2/g$, with 120-200 $m^2/g$ being preferred. The patentee also teaches that the catalysts have total pore volume of 0.6 cc/g with about 68% thereof being in the form of micropores (<500 Å) and about 32% being in the form of interconnected, access macropores. Column 4 lines 33-38. The patentee fails to disclose or suggest either the total pore volume or pore size distribution of the invented catalysts.

Other proposals that may be of interest in disclosing demetallation catalysts having specific combinations of physical properties are summarized in Table 1 wherein "SA" stands for surface area, "PV" stands for pore volume and "PSD" stands for pore size distribution.

TABLE 1

| U.S. PAT. NO. (INVENTOR) | SA ($m^2/g$) | PV (cc/g) | PSD PV | PORE RADIUS (Å) |
|---|---|---|---|---|
| 3,977,961 (Hamner) | Approximately ≧200-600 | 0.8-3.0 | "minimal" Approximately 50-100 | 0-25 |
| 3,998,722 (Mayer et al.) | Approximately ≧200-600 | 0.8-3.0 | Approximately ≧15[(2)] | 75-125 |

TABLE 1-continued

| U.S. PAT. NO. (INVENTOR) | SA (m²/g) | PV (cc/g) | PSD PV | PSD PORE RADIUS (Å) |
|---|---|---|---|---|
| 4,014,821 (Hamner) | Approximately ≧200–600 | 0.8–3.0 | Approximately ≧15[3] "minimal" | 87.5–137.5 150–175 |
| 4,003,828[4] (Eberly, Jr.) | 172–292[5] | 0.41–0.56[5] | UNSPECIFIED | |
| 4,089,774 (Oleck et al). | 125–210 | 0.4–0.65 | ≧10 ≧45 ≧15 | <15 15–75 >150 |
| 4,119,531 (Hopkins et al.) | ≧120 | ≧0.7 | UNSPECIFIED | |
| 4,192,736[4] (Kluksdahl) | UNSPECIFIED | 0.3–1.1 | ≧50 ≧3 | 30–125 >500 |
| 4,225,421 (Hensley, Jr. et al.) | 140–300 | 0.4–1.0 | 3–30 97–70 60–95% of PV in R < 300 0–15% of PV in R > 300 | ≧300 <300 25–100 100–300 |
| 4,242,236 (Blakely) | 150–300 | 0.75–1.3 | <10 0–15% of PV in R < 300 | ≧500 100–300 |

[1]Catalyst of average particle diameter up to 1/50".
[2]Catalyst of average particle diameter of 1/50–1/25".
[3]Catalyst of average particle diameter of 1/25–1/8".
[4]Catalysts contain phosphated-alumina supports.
[5]Values taken from patentee's examples.

Other proposals of possible interest from the standpoint of disclosing catalysts having specific combinations of properties, though lacking in reported demetallation activity as well as distinguishable in terms of physical properties are summarized in TABLE 2.

TABLE 2

| U.S. PAT. NO. (INVENTOR) | SA (m²g) | PV (cc/g) | PSD PV | PSD PORE RADIUS (Å) |
|---|---|---|---|---|
| 3,622,500[1] (Alpert et al.) | UNSPECIFIED | 0.4–1.1 | 0.3–0.5 cc/g | <125 |
| 3,870,623 (Johnson et al.) | UNSPECIFIED | 0.4–1.1 | 0.1–0.6 cc/g | >125 |
| 3,803,027[2] (Christman et al.) | ≧100 | 0.41–0.58[3] | 0.4–0.8 cc/g | 7–300 |
| 3,843,509[4] (Suto et al.) | 181–283[3] | 0.43–0.57[3] | ≧50% ≧0.30 cc/g Approximately <25% of PV in R = 0–300 Approximately <40% of PV in R = 0–300 Approximately <0.25 cc/g | 50–300 0–300 0–30 75–300 75–75,000 |
| 3,966,588[5] (Beaty, Jr.) | 225–400 | 1.0–2.75 | >50% | <500 |
| 4,008,149[6] (Itoh et al.) | 250–300 | 0.5–1.0 | Approximately ≧80% of PV in R = 0–75 <20% of PV in R = 0–150 0.45–0.6 cc/g <0.1 cc/g | 30–75 75–150 0–300 75–500 |
| 4,051,021 (Hamner) | 150–450 | 0.3–1.0 | ≧50% | 35–80 |
| 4,066,572[7] (Choca) | 62–311 | 0.51–1.1 | 6–60% | <50 |

[1]Bulk density = 0.4–1.0 g/cc.
[2]Bulk density = 0.3–0.8 g/cc and Specific Volume of Pores (defined as density × volume in pores with radii of 7–300 Å × volume % of PV in pores with radii of 50–300 Å) ≧ 20.
[3]Values taken from patentee's examples.
[4]Examples report bulk density = 0.6–0.81 g/cc.
[5]Loose bulk density = 7.5–25 lb/ft³ = 0.12–0.40 g/cc.
[6]Bulk density = 0.5–1.0 g/cc.
[7]Phosphated-alumina support. All values taken from patentee's examples.

As will be apparent from the following description, none of the patents discussed hereinabove and summarized in TABLES 1 and 2 discloses or suggests the novel combination of physical properties that we have found to yield the superior hydrotreating results, especially in terms of demetallation, that are attained according to the present invention.

BRIEF DESCRIPTION OF THE DRAWINGS

FIGS. 1, 2, 3 and 4 are plots of wt% Metals on Catalyst vs. Relative Demetallization Activity.

DESCRIPTION OF THE INVENTION

Figure 1:
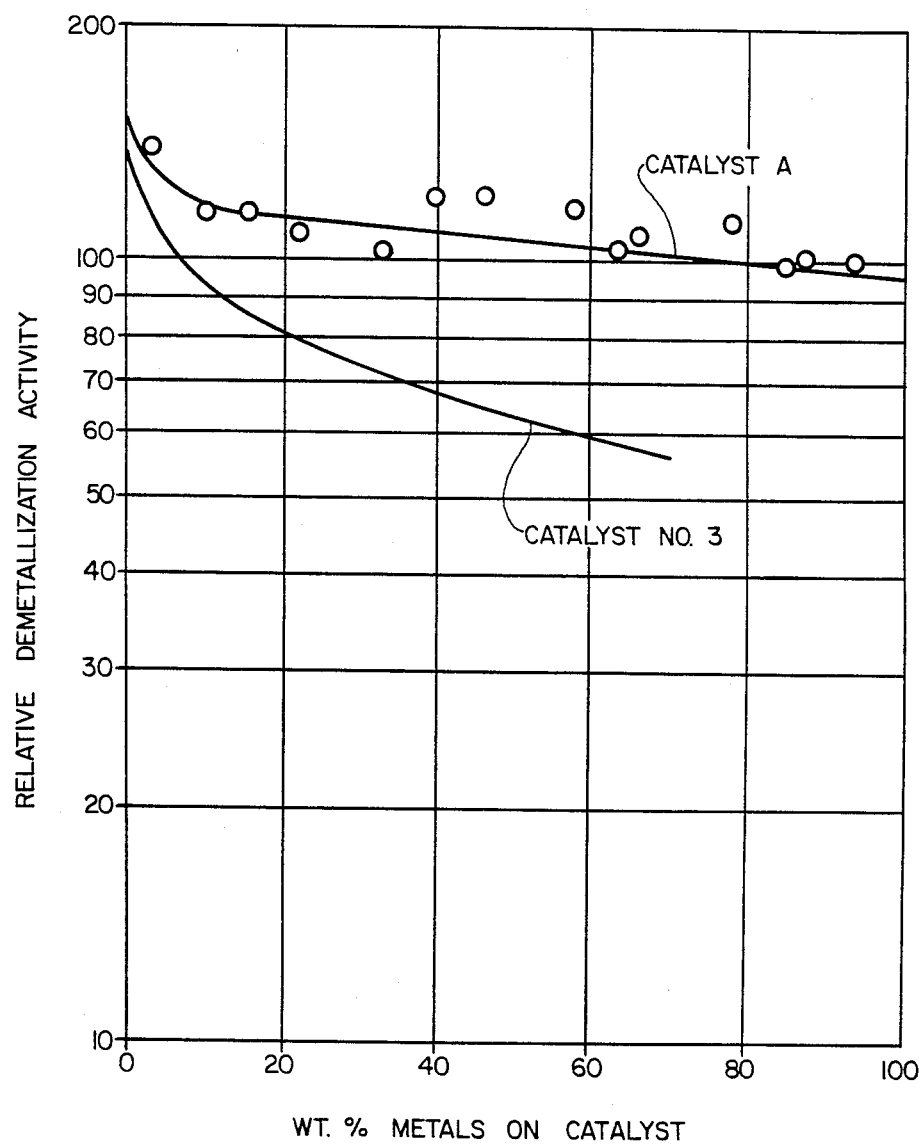

Briefly, the catalysts of our invention comprise a hydrogenating component composited with a support, such catalysts having BET surface area of 150 to about 190 m²/g, pore volume of about 0.8 to about 1.2 cc/g as determined by nitrogen desorption in micropores having radii up to 600 Å, with at least 0.7 cc/g of such micropore volume in pores having radii of 50 to 600 Å, pore volume of 0.1 to about 0.5 cc/g as determined by mercury penetration in macropores having radii of 600 to 25,000 Å and bulk density of 0.3 to 0.5 g/cc. For use in hydrotreating hydrocarbon feeds susceptible to upgrading, a feed and hydrogen are contacted in the presence of the invented catalysts under hydrotreating conditions. The invented catalysts are particularly useful first stage catalysts in multi-stage hydrotreating processes in which predominant first stage reactions comprise demetallation reactions and predominant subsequent stage reactions comprise desulfurization reactions. Especially good results are attained in demetallation of high metals or high metals and high sulfur content feeds.

In greater detail, the hydrogenating component of the invented catalysts comprises a metallic component having hydrogenating activity. Suitable metals include those of Group VIB, Group VIII and vanadium as well as combinations thereof. Specific examples of the Group VIB and VIII metals include chromium, molybdenum, tungsten, iron, cobalt, nickel, ruthenium, rhodium, palladium, osmium, iridium and platinum. These can be present in elemental form, as oxides or sulfides, or as combinations thereof. Among such metals, those of Group VIB are preferred because, unlike the Group VIII metals and vanadium, the Group VIB metals promote substantial desulfurization in addition to demetallation. Among the Group VIB metals, molybdenum is most preferred from the standpoint of overall activity, with tungsten being less preferred and chromium being least preferred. Among the Group VIII metals, the non-noble metals iron, cobalt and nickel are preferred from the standpoint of demetallation activity and cost, with cobalt and nickel being most preferred. Various combinations also are contemplated, preferred combinations being those comprising at least one Group VIB metal in order to attain both desulfurization and demetallation activity. Specific examples of preferred combinations include cobalt-molybdenum, nickel-molybdenum and vanadium-molybdenum.

The support component of the invented catalysts comprises at least one porous refractory inorganic oxide. The precise composition of the support is relatively unimportant so long as the required physical properties are attained. Examples of useful supports include alumina, silica, silica-alumina, silica-stabilized-alumina, phosphated-alumina, silica-stabilized-phosphated-alumina, fluorided-alumina, alumina-aluminum phosphate, boria-alumina, magnesia-alumina, boria, magnesia, titania, zirconia, and the like. Support compositions presently preferred from the standpoint of catalyst performance are those comprising alumina and at least one oxide of phosphorus and those comprising alumina and silica. Silica-stabilized alumina is an example of the latter. Certain of these also offer advantages in terms of easy attainment of suitable physical properties by steaming to increase average pore diameter without appreciably decreasing pore volume. Steaming of such supports as well as other suitable supports is described in detail in our U.S. Pat. Nos. 4,395,328 and 4,399,057, respectively, filed of even date herewith.

Relative proportions of hydrogenating component and support are not critical, though if too little hydrogenating component is present, initial activity will be lower than desired such that an activation period, during which feed metals are laid down on the catalyst, will be required for the catalyst to reach maximum activity. Preferably, the invented catalysts contain sufficient hydrogenating component that maximum demetallation activity is achieved before deposition of appreciable levels of metals from a feed. It also is preferred to limit hydrogenating component concentration somewhat because metals holding capacity typically decreases with increasing hydrogenating metal concentration. More preferably, hydrogenating component concentration ranges from about 2.5 to about 15 wt.%, calculated as metal oxide and based on total catalyst weight, in order to balance initial activity against metals holding capacity. Most preferably, hydrogenating component content ranges from about 3.5 to about 8 wt.%.

Catalyst physical properties that are important from the standpoint of demetallation activity and suitability for process use include surface area, pore volume, pore size distribution, and bulk density. BET surface area ranges from 150 to about 190 m$^2$/g. Surface areas less than 150 m$^2$/g are disadvantageous because contact between active hydrogenation sites and feed components is limited such that catalytic activity suffers. Surface areas greater than about 190 m$^2$/g are suitable from the standpoint of ensuring access of reactants to active sites; however, mechanical strength and bulk density decrease so much that the catalyst is easily damaged during use and must be replaced rapidly. Preferably, in order to maximize exposure of reactants to active hydrogenating sites while ensuring sufficient crush strength and bulk density, BET surface area ranges from about 150 to about 180 m$^2$/g. Best results are attained when the majority of catalyst particles have surface areas of about 160 to about 170 m$^2$/g.

The distribution of pores of the invented catalysts is such that micropore volume is 0.8 to about 1.2 cc/g as determined by nitrogen desorption and macropore volume is about 0.1 to about 0.5 cc/g as determined by mercury penetration. For purposes hereof, micropores are defined as pores with radii up to 600 Å while macropores are pores with radii of 600–25,000 Å. As noted hereinabove, a relatively large micropore volume appears to be important from the standpoint of attaining high exposure of reactants to catalytically active sites, while a small but appreciable macropore volume is necessary to ensure access to the micropores and activity maintenance. If either micro- or macropore volume is too high, however, catalyst mechanical strength and bulk density can suffer. In order to attain maximum demetallation activity and maintenance of such activity while maintaining a desirable level of bulk density and mechanical strength, micropore volume preferably ranges from about 0.9 to about 1.3 cc/g and macropore volume preferably ranges from about 0.15 to about 0.50 cc/g.

Total pore volume, i.e., the sum of micropore volume and macropore volume ranges from 0.9 to about 1.5 cc/g, with about 1.1 to about 1.5 cc/g being preferred from the standpoint of attaining a desirable overall combination of demetallation activity, activity maintenance and other properties.

Micropore distribution also is important from the standpoint of demetallation activity and activity maintenance. As noted hereinabove, at least 0.7 cc/g of micropore volume is concentrated in pores having radii of 50 to 600 Å. Preferably, at least 0.75 cc/g of micropore volume is in pores having radii of 50–600 Å in order to maximize activity and minimize activity decline. Micropore volume in pores 50–600 Å in radius preferably is distributed such that about 15 to about 60% thereof is provided by pores having radii of 50–100 Å and about 40 to about 85% thereof is provided by pores having radii of 100–600 Å. Though not required, it also is desirable to limit micropore volume in pores having radii less than 50 Å to below about 0.15 cc/g as such pores contribute only insubstantially, if at all, to activity. Best results in terms of demetallation activity and activity maintenance are attained with catalysts containing up to about 0.15 cc/g micropore volume in pores having radii less than 50 Å, at least about 0.8 cc/g of micropore volume in pores having radii of 50–600 Å, and of that, about 20 to about 55% in pores having radii of 50 to 100 Å and about 45 to about 80% in pores having radii of 100 to 600 Å.

Bulk density, while not critical from the standpoint of demetallation activity per se, is important in terms of utility of the invented catalysts in a wide range of processes and under a wide range of process conditions. Bulk density of the invented catalysts ranges from about 0.3 to about 0.5 g/cc with bulk densities in the upper portion of the range being best suited for fixed bed use and bulk densities in the lower portion of the range being best suited for expanded bed use. Below about 0.3 g/cc it is difficult to load enough catalyst into typical reactors to attain economically feasible results, and the catalyst is too light to be used in expanded bed processes without substantial carryover. Bulk densities above about 0.5 g/cc are suitable from the standpoint of process utility but are difficult to attain given the surface areas and pore volumes of the invented catalysts. Bulk densities that are preferred from the standpoint of balancing catalyst loading requirements against physical properties important with respect to demetallation range from about 0.38 to about 0.45 g/cc.

Other physical properties which are not critical with respect to catalyst activity or process use but may influence performance include mechanical strength, abrasion resistance and average particle size. Mechanical strength should be at least high enough to permit use in a given process without undesirable fragmentation or other damage. Similarly, abrasion resistance should be high enough to permit the catalyst particles to withstand particle to particle contact as well as contact between particles and reaction zone internals, particularly in expanded bed processes. Preferably, crush strength of the invented catalysts is such that a particle ⅛-inch in length and 1/32-inch in diameter will withstand at least about three pounds of pressure. Catalyst size varies somewhat depending on the particular process to be used. Preferred catalysts range from about 1/50 to about 1/16-inch diameter. Catalyst shape can vary widely depending on process requirements.

The invented catalysts can be prepared by any suitable method. Conveniently, a support of predetermined shape and size is impregnated with appropriate amounts of one or more solutions of compounds of the metal or metals of the hydrogenating component, such compounds being convertible to metal oxides on calcination. Alternately, a solution or solutions of metal compounds convertible to oxides is mixed with powdered support and then shaped. The preferred solvent for the impregnating solutions is water owing to its cost; however, alcohols as well as various other solvents for the metal compounds can be used if desired. Soluble compounds of the hydrogenating metals are well known to persons skilled in the art.

Following incorporation of hydrogenating metal compound or compounds with the support, the result is heated in the presence of a gas containing molecular oxygen at a temperature and for a time sufficient to convert the metal compound or compounds to metal oxides. Preferred temperatures range from about 800° to about 1,200° F. (about 427° to about 649° C.) and preferred times range from about ½ to about 20 hours.

As noted hereinabove, the support component of the invented catalyst can vary widely in terms of composition so long as the required physical properties of the final catalyst can be attained. In order to attain such properties it often is necessary to employ pre-shaped support having appropriate properties in preparation of the catalyst. Preferably, surface area and/or pore volume of the support is at least slightly greater than that of the final catalyst as incorporation of metals and calcination tend to slightly decrease surface area and pore volume. Pore size distribution also must be similar. Certain support materials having higher than desired surface area and/or insufficient pore volume in pores of sizes that contribute significantly to activity and maintenance thereof can be rendered suitable for use according to this invention, for example, by heating in the presence of steam as discussed in greater detail hereinbelow. Of course, it also is contemplated to use supports that are not pre-shaped, in which case steps should be taken to ensure that the final catalyst will have the proper physical properties after calcination and shaping operations.

A specific catalyst according to the present invention is one comprising a hydrogenating component and a phosphated-alumina support which, prior to incorporation of hydrogenating component, is calcined in the presence of steam to open its pores as described in detail in our aforesaid, U.S. Pat. No. 4,395,328, filed on even date herewith and incorporated herein by reference. Prior to calcination in the presence of steam, the phosphated alumina preferably has a surface area of about 190 to about 400 m$^2$/g and pore volume of about 0.9 to about 1.5 cc/g; however, steaming serves to increase average pore diameter without appreciably decreasing pore volume such that a final catalyst having physical properties required according to the present invention can be attained.

Another specific catalyst according to the present invention is one comprising a hydrogenating component and a support comprising at least two refractory inorganic oxides. Supports comprising alumina and silica, particularly those such as silica-stabilized aluminas having about 2 to about 10 wt. % silica based upon support weight, give particularly good results in terms of demetallation activity and activity maintenance. Such supports can be heated in the presence of steam prior to deposition of hydrogenating component if necessary or desirable from the standpoint of attaining suitable physical properties. Steaming of such supports is described in detail in our aforesaid, U.S. Pat. No. 4,399,057, filed of even date herewith and incorporated herein by reference. A preferred combination of refractory oxides that gives good results in terms of steaming and ultimate catalyst performance is alumina in combination with silica, particularly about 2 to about 10 wt % silica based upon support weight.

It is to be understood that methods other than heating in the presence of steam in accordance with the aforesaid applications are contemplated for attaining support materials of suitable pore volume and surface area.

Prior to use in hydrotreating of hydrocarbon feeds the invented catalysts may be subjected to a presulfiding treatment if desired. When the hydrogenating component consists of one or more Group VIB metals, presulfiding treatment has little effect on catalyst performance. However, when the hydrogenating component contains other metals it is preferred to conduct the presulfiding treatment to convert the metals of the hydrogenating component to partially reduced metal sulfides which typically are more active than the elemental metals or the metal oxides. A sulfiding pretreatment that is preferred from the standpoint of cost and convenience involves contacting a catalyst with a mixture of hydrogen and hydrogen sulfide at varying pressure and increasing temperature over a period of time. Other suitable presulfiding treatments involve contacting the catalyst with hydrogen and carbon disulfide or a light hydrocarbon oil containing sulfur compounds at elevated temperature for a period of time sufficient to effect conversion of the metal components of the hydrogenating component to metal sulfides.

The process according to this invention comprises contacting a hydrocarbon feed susceptible to upgrading with hydrogen in the presence of the above-described catalysts under hydrotreating conditions. Owing to the high demetallation activity of the invented catalysts, the same preferably are used to hydrotreat feeds having at least appreciable metals content, e.g., at least about 30 ppm. Examples include crude oils, topped crude oils, petroleum hydrocarbon residua, atmospheric and vacuum resids, oils obtained from tar sands, residua derived from tar sand oil, and hydrocarbon streams derived from coal or oil shale.

Fixed and expanded bed hydrotreating processes are contemplated herein. In fixed bed processes, hydrocarbon feed and a hydrogen-containing gas are passed downwardly through a packed bed of catalyst under conditions, such as temperature, pressure, hydrogen flow rate, space velocity, etc., that vary somewhat depending on the choice of feed, reactor capacity and other factors known to persons of skill in the art. As noted hereinabove, catalyst crush strength is important in fixed bed operations due to the pressure drop resulting from passage of hydrocarbon feed and hydrogen-containing gas through the packed catalyst bed. Catalyst size and shape also can be important in fixed bed operations due to their effect not only on pressure drop through the bed but also on catalyst loading and contact between catalyst and feed components. The use of larger catalyst particles at the top of a catalysts bed and smaller particles throughout the remainder of the bed can lead to decreased pressure drop. Catalyst in the form of spheres or extrudate, preferably about 0.01 to about 0.1 inch (about 0.25 to about 2.5 mm) in diameter, give good results in terms of promoting adequate contact between catalyst and feed components while avoiding excessive pressure drop through a catalyst bed. More preferably, particles of about 1/32 to about 1/16-inch (about 0.79 to about 1.6 mm) diameter are used. Trilobe, cloverleaf, cross, and "C"-shaped catalysts such as are disclosed in commonly assigned U.S. Pat. No. 3,674,680 (Hoekstra et al.) give particularly good results in terms of maximizing catalyst efficiency and promoting a high level of contact between catalyst and feed components. Further details with respect to fixed bed use of the invented catalysts are found in our above-referenced, Pat. Nos. 4,395,328 and 4,399,057.

In expanded bed processes, a packed catalyst bed is expanded and mobilized by upflow of hydrocarbon feed and hydrogen-containing gas at space velocities effective to provide adequate mobilization and expansion, and thereby promote contact between catalyst particles and reactants, without substantial carryover of catalyst particles. As noted hereinabove, catalyst bulk density is important from the standpoint of attaining appropriate bed expansion and mobilization at economically practical space velocities. Catalyst particle size and shape also are important in this regard. Preferred catalysts for expanded bed use are extrudates of about 0.02 to about 0.05 inch (about 0.5 to about 1.3 mm) diameter, with about 1/32-inch (about 0.79 mm) being most preferred.

A preferred expanded bed process, particularly for treatment of high metals or high metals and sulfur content feeds is an ebullated bed process. In such processes, catalyst preferably is present in an amount sufficient to occupy at least about 10 volume % of the expanded bed and is continuously added to the reaction zone to compensate for spent catalyst which is continuously withdrawn. Specific details with respect to ebullated bed processes are found in Example III hereinbelow and U.S. Pat. No. 3,188,286 (Van Driesen), U.S. Pat. No. 2,987,465 and its U.S. Pat. No. Re. 25,770 (both Johanson) and U.S. Pat. No. 3,630,887 (Mounce et al.), which are incorporated herein by reference.

Irrespective of whether a fixed or expanded bed operation is employed, hydrotreating conditions according to this invention will vary depending largely on the particular feed employed. Suitable conditions for various feeds are summarized in the following table:

| FEED | PRESSURE (psig) | TEMPERATURE (°F.) | H$_2$ RATE (SCFB) | SPACE VELOCITY (lb/hr/lb Catalyst) |
|---|---|---|---|---|
| DISTILLATES* | 300–750 | 600–725 | 400–1000 | 2–5 |
| GAS OILS* | 500–1000 | 600–750 | 800–1600 | 1–4 |
| ATMOSPHERIC RESID | 500–2000 | 600–850 | 500–3000 | 0.5–2 |
| VACUUM RESID | 1000–10,000 | 600–950 | 1000–10,000 | 0.2–3 |

*Specific examples of distillates and gas oils particularly well suited for hydrotreating according to the invention are those derived from oil shales which often contain substantial levels of arsenic.

According to a preferred embodiment of the invention, high metals or high metals and high sulfur content feed comprising resid is contacted with hydrogen in the presence of an ebullating bed of the invented catalyst at an average temperature of about 700° to about 900° F. (about 371° to about 482° C.), total pressure of about 500 to about 6,000 psig (about 3.55 to about 41.5 MPa), hydrogen partial pressure of about 500 to about 3,000 psia (about 3.45 to about 20.7 MPa), hydrogen flow rate or hydrogen addition rate of about 1,000 to about 10,000 SCFB (about 178 to about 1780 m$^3$/m$^3$) (gas volumes measured at 15.6° C. and 101.3 kPa), and LHSV of about 0.2 to about 2.5 volumes of hydrocarbon per hour per volume of catalyst. Preferred operating conditions comprise an average temperature of about 730° to about 810° F. (about 388° to about 432° C.), total pressure of about 1,200 to about 3,000 psig (about 8.4 to about 20.8 MPa), hydrogen partial pressure of about 1,200 to about 2,000 psia (about 8.3 to about 13.8 MPa), hydrogen flow rate or hydrogen addition rate of about 8,000 SCFB (712 m$^3$/m$^3$), and LHSV of about 0.4 to about 2.0 volumes of hydrocarbon per hour per volume of catalyst. Preferred feeds for such operations include vacuum and atmospheric resids derived from petroleum crudes, coal and shale oils having at least 100 ppm metals and an appreciable level of sulfur as well as blends of such resids with lighter materials e.g., heavy vacuum gas oils.

A particularly preferred process for using the invented catalysts is in multi-stage hydrotreating of high metals and sulfur content feeds wherein metals content of the feed is reduced by treatment in an initial stage in which the invented catalyst is used, followed by one or more subsequent stage of stages in which a catalyst having high hydrodesulfurization activity is used. Individual stages can be conducted in single or multiple zones. Hydrodesulfurization catalysts particularly well suited for use in conjunction with the invented catalysts in such multi-stage processes are disclosed in our commonly assigned U.S. Pat. Nos. 4,181,602, and 4,212,729, commonly assigned U.S. Pat. No. 4,224,144 (Hensley et al.), our commonly assigned, U.S. Pat. No. 4,297,242 and commonly assigned U.S. Pat. No. 4,306,965 in the name of Hensley, Quick and Hopkins. All of such patents are incorporated herein by reference.

The following examples illustrate the present invention, it being understood that the same are for purposes of illustration and not limitation. In all examples, micropore volume and pore size distribution were determined by nitrogen desorption using a Digisorb 2500 instrument. Macropore volumes were determined by mercury penetration using a mercury porosimeter.

EXAMPLE I

A pilot scale catalyst comprising 4 wt.% $MoO_3$ composited with a support comprising 96 wt.% $Al_2O_3$ and 4 wt.% $SiO_2$ was prepared for us by American Cyanamid, Inc. Physical properties of the catalyst were as follows:

| | |
|---|---|
| BET SURFACE AREA: | 186 m$^2$/g |
| PORE VOLUME | |
| MACROPORE | 0.49 cc/g |
| MICROPORE | 1.00 cc/g |
| TOTAL | 1.49 cc/g |
| AVERAGE PORE DIAMETER | 320 Å |
| (D = 4V × 10$^4$/A) | |
| PORE SIZE DISTRIBUTION | |

| | PORE VOLUME | |
|---|---|---|
| PORE RADII (Å) | RELATIVE (%) | ASBOLUTE (cc/g) |
| 0–50 | 8.8 | 0.13 |
| 50–100 | 30.7 | 0.46 |
| 100–600 | 27.3 | 0.41 |
| 600–25,000 | 33.2 | 0.49 |

| | |
|---|---|
| BULK DENSITY: | 0.38 g/cc |
| CRUSH STRENGTH: | 3.4 lbs/⅛" |

Demetallation activity of the catalyst was tested according to the following procedure. Prior to use, the catalyst was screened to 14–20 mesh (U.S. Sieve Series), corresponding to 1.41–0.85 mm particle size, and calcined in still air at 538° C. (1000° F.) for 1 hour. Subsequently, the catalyst was cooled in a desiccator.

Catalyst was packed into a bench-scale test unit having automatic controls for pressure, flow of reactants, and temperature. The reactor was made of 0.953 cm (⅜-inch) inside-diameter stainless-steel, heavy-walled tubing. A 0.318 cm (⅛-inch) outside-diameter thermowell extended up through the center of the reactor. The reactor was heated by an electrically-heated steel block. The 14–20-mesh catalyst material was supported on 8–10 mesh (2.38–1.68 mm) alundum particles. Approximately 15 cubic centimeters of catalyst were employed as the catalyst bed in each test. This amount of catalyst provided a catalyst bed length of about 25.4 cm (10 in). A 25.4 cm (10 in) layer of 8–10 mesh (2.38–1.68 mm) alundum particles was placed over the catalyst bed in the reactor for each test. The catalyst that was employed was located in the annular space between the thermowell and the internal wall of the 0.953 cm (⅜-inch) inside-diameter reactor.

The unit was brought to operating conditions and hydrogen and hydrocarbon feed were charged to the reactor, the latter by means of a positive displacement pump (Ruska). Hydrogen addition rate ranged from 890 to 1424 m$^3$/m$^3$ (5000–8000 SCFB) and hydrocarbon space velocity (LHSV) was 1 cc hydrocarbon per hour per cc of catalyst. Operating conditions included a total pressure of 12.5 MPa (1800 psig) and temperature of 416° C. (780° F.).

In order to determine demetallation activity at increasing metals loadings, the hydrocarbon feed to the reactor was varied intermittently between an Ardeshir vacuum resid and a Jobo vacuum resid. Feedstock properties are reported in Table 3.

TABLE 3

| (Feedstock Properties) | | |
|---|---|---|
| FEED | ARDESHIR | JOBO |
| GRAVITY (°API) | 3.2 | 5.2 |
| COMPOSITION (wt %) | | |
| OILS | 12.7 | 22.9 |
| ASPHALTENES | 15.5 | 14.6 |
| RESINS | 71.8 | 62.5 |
| CARBON RESIDUE (wt %) | 27.8 | 22.0 |
| CARBON (wt %) | 83.65 | 83.54 |
| HYDROGEN (wt %) | 9.73 | 9.78 |
| NITROGEN (wt %) | 0.60 | 0.97 |
| SULFUR (wt %) | 5.7 | 4.85 |
| OXYGEN (wt %) | 0.3 | 0.96 |
| NICKEL (ppm) | 72 | 167 |
| VANADIUM (ppm) | 262 | 799 |

The Ardeshir feed is representative of typical high metals, high sulfur feeds of the type particularly well suited for hydrotreating with the invented catalysts while the Jobo feed, also well suited for treatment according to this invention, is an extremely high metals feed and was used primarily to attain high metals loading at a rapid rate. The Ardeshir feed was run on days 1 to 6, resulting in a metals loading of 10 wt % based upon catalyst weight. On day 7, the feed was changed to Jobo which then was run through day 20 resulting in 51.7 wt % metals loading. Ardeshir was again run from day 21 to day 24 and metals loading increased to 57.8 wt %. Jobo was run from day 25 to day 41, resulting in 110 wt % metals loading. From day 42 to day 45, Ardeshir was again run such that at day 45, metals loading was 116 wt %.

The results of the tests are presented in the accompanying FIG. 1 in which the above described catalyst is identified as CATALYST A. Also shown in FIG. 1 are results obtained with another catalyst (CATALYST NO. 3) according to the invention. Preparation, composition and properties of CATALYST NO. 3 are described in detail in EXAMPLE II as is the method of testing that catalyst.

Relative activity of each catalyst is plotted against the wt.% of metals (nickel and vanadium) that were retained on the catalyst. This relative activity was obtained by dividing the volume of a reference catalyst (CATALYST NO. 2, EXAMPLE II), having an assigned activity value of 100, by the volume of the experimental catalyst that is needed to reduce the metals content of the feed to the same metals content when operating at constant temperature and pressure. As can be seen from the figure, relative demetallation activity of CATALYST A was high at the start of the test and remained high even at 100% metals loading.

EXAMPLE II

Figure 2:
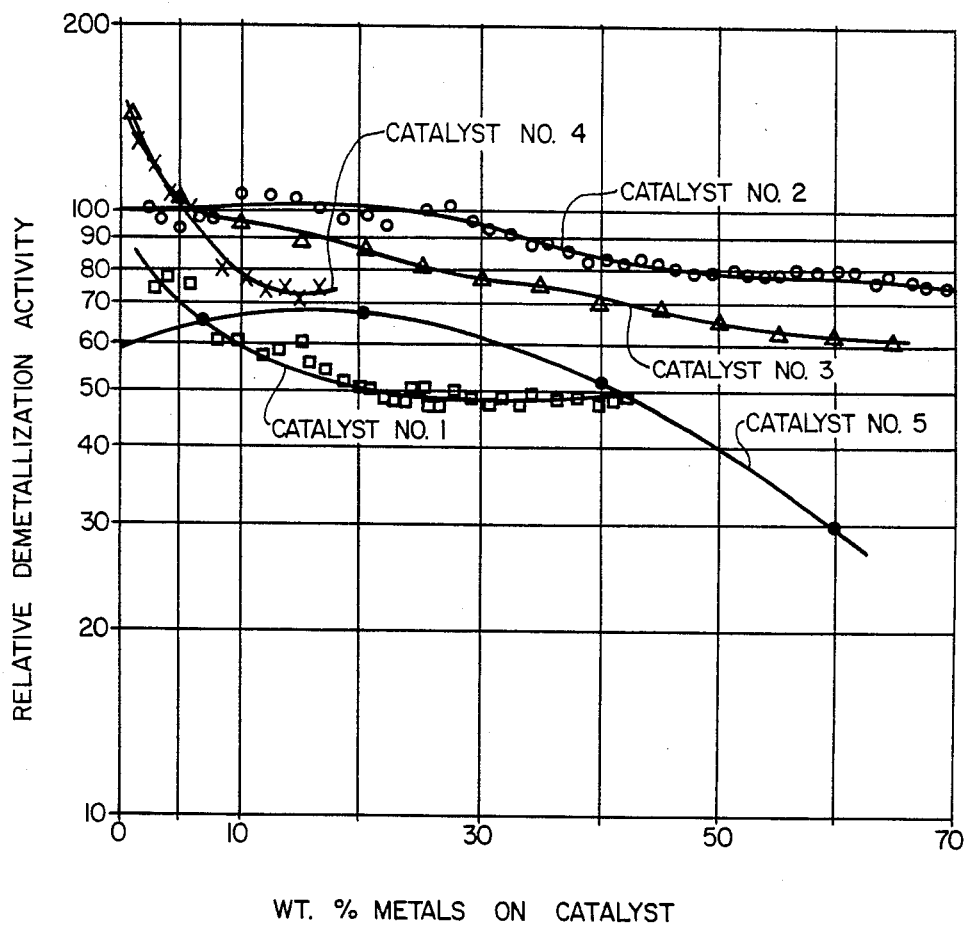

The catalysts and testing described in this example are identical to those described in Example I of U.S. Pat. Nos. 4,395,328 and 4,399,057. The accompanying FIG. 2 is identical to FIG. 2 of such patents.

Four catalysts were prepared in the laboratory as described hereinafter. Each of the laboratory preparations involved adding an aqueous solution of ammonium heptamolybdate to a support material, thoroughly mixing the result, permitting the resulting mixture to stand for a period of time as designated hereinafter, drying the material under a heat lamp and calcining the dried material in air for 2 hours at a temperature of 1,000° F. (538° C.). Two of the catalysts, (Catalysts Nos. 1 and 4), were prepared using supports obtained from Katalco Corporation which were prepared to contain from about 8 wt% to about 10 wt% oxides of phosphorus, calculated as $P_2O_5$. Bulk densities of the supports used to prepare Catalysts Nos. 1 and 4 were 0.35 and 0.42 g/cc respectively. Catalyst No. 2 was prepared by steaming the support of Catalyst No. 1, and then incorporating the hydrogenating component while Catalyst No. 3 was prepared by steaming the support of Catalyst No. 4 and then incorporating the hydrogenating component.

In preparation of Catalysts Nos. 2 and 3, steaming was performed at a temperature of approximately 816° C. (1,500° F.) for 30 minutes at a steam pressure of 0.8 atm. in a 3.8-cm (1.5-in) inside diameter quartz tube that was held in a vertical position within a tube furnace. A mixture of steam and nitrogen (approximately 80 volume % steam) was controlled by operating needle valves and was measured by flow meters. The steam-nitrogen mixture was introduced into the bottom of the quartz tube and flow was adjusted to be maintained at a rate of about 200 cc/min. The support material was rapidly heated to the temperature desired. After the appropriate temperature was obtained, the steam-nitrogen gas stream was permitted to pass through the support material bed for the time desired. At the end of the steaming step, the steam flow was stopped while nitrogen flow was continued. The steamed material was rapidly cooled by turning off the furnace and removing the quartz tube from the furnace while nitrogen flow was maintained.

Further details with respect to preparation and properties of Catalysts Nos. 1–4 are presented in Table 4.

TABLE 4

| CATALYST NO. | CATALYST DATA | | | |
|---|---|---|---|---|
| | 1 | 2 | 3 | 4 |
| SUPPORT NO. | 1 | 1 | 2 | 2 |
| SUPPORT WT. (gm) | 229.4 | 187 | 1,056 | 192 |
| IMPREGNATION SOL'N. PREPARED WITH: | | | | |
| ammonium heptamolybdate (gm) | 11.7 | 9.5 | 54.0 | 9.8 |
| distilled water (ml) | 400 | 350 | 2,000 | 250 |
| STANDING TIME DURING IMPREGNATION (hr.) | 16 | 16 | 2 | — |
| SUPPORT STEAMED | NO | YES | YES | NO |
| MoO3/SUPPORT (gm/gm) | 0.04 | 0.04 | 0.04 | 0.04 |
| SUPPORT PROPERTIES: | | | | |
| SURFACE AREA (m²/gm) | 219 | 179 | 173 | 232 |
| PORE VOL. (cc/gm) | 1.433 | 1.427 | 1.108 | 1.172 |
| CALC. A.P.D. (Å) | 261 | 319 | 256 | 202 |
| % OF P.V. IN PORES OF RADIUS (Å): | | | | |
| 0–50 | 13.8 | 7.7 | 14.1 | 25.4 |
| 50–100 | 25.2 | 22.7 | 29.6 | 36.5 |
| 100–600 | 51.5 | 59.6 | 39.0 | 26.7 |
| 600–25,000 | 9.5 | 10.0 | 17.3 | 11.4 |
| CATALYST PROPERTIES: | | | | |
| SURFACE AREA (m²/gm) | * | 162 | * | 217 |
| PORE VOL. (cc/gm) | | | | |
| MICROPORES | * | 1.25 | * | 0.98 |
| MACROPORES | * | 0.13 | * | 0.15 |
| TOTAL | * | 1.382 | * | 1.131 |
| CALC. A.P.D. (Å) | * | 341 | * | 209 |
| % OF P.V. IN PORES OF RADIUS (Å): | | | | |
| 0–50 | * | 6.7 | * | 22.8 |
| 50–100 | * | 16.7 | * | 33.8 |
| 100–600 | * | 67.2 | * | 30.2 |
| 600–25,000 | * | 9.4 | * | 13.2 |

*Values estimated to be comparable to those of support.

Catalysts Nos. 1 and 2 were prepared in the form of 0.79 mm (1/32-in) extrudates while Catalysts Nos. 3 and 4 were prepared as 0.1 cm (1/25-in) spheres. Bulk densities of all of the catalysts were about 0.4 g/cc.

A fifth catalyst, identified hereinafter as Catalyst No. 5 and containing 1 wt% $MoO_3$ on a catalytically active alumina, was obtained from the American Cyanamid Company. This catalyst, which was obtained in the form of 0.79-mm (1/32-in) extrudates, had a BET surface area of 187 m²/gm, a pore volume of 1.042 cc/gm and an average pore diameter of 222 Å. Macropore volume was 0.17 cc/g and micropore volume was 0.86 cc/g with 0.68 cc/g of that in pores having radii of 50–600 Å. Its pore size distribution provided 17.7% of the pore volume in 0–50 Å pores, 45.5% of the pore volume in 50–100 Å pores, 20.6% of the pore volume in 100–600 Å pores, and 16.2% of the pore volume in 600–25,000 Å pores. Bulk density was 0.47 g/cc.

Demetallation performance of catalysts 1–5 was evaluated in accordance with the procedure of Example I except that an Ardeshir feed was used in each test. In the test using Catalyst No. 1 three points (the first three in FIG. 2) were generated using an Ardeshir vacuum resid having API gravity of 4.8° and containing 24.0 wt.% oils, 14 wt.% asphaltenes, 61.3 wt.% resins, 25.6 wt.% carbon residue, 83.68 wt.% carbon, 9.88 wt.% hydrogen, 0.52 wt.% nitrogen, 5.1 wt.% sulfur, 63 ppm nickel and 227 ppm vanadium. The remaining points for Catalyst No. 1 were generated using the Ardeshir feed described in Table 3. All other data in FIG. 2 was generated with the Ardeshir feed described in Table 3.

As can be seen from the results shown in FIG. 2, Catalysts Nos. 2 and 3, having properties according to the present invention, exhibited high initial activity and excellent activity maintenance even at high metals loadings. Comparative Catalysts 1 and 4, which had higher surface areas than Catalysts Nos. 2 and 3, and inferior pore structure, also had good initial activity but activity declined rapidly. Comparative Catalyst No. 5, which had insufficient volume in micropores having radii of 50–600 Å and low metals content, had poor initial activity though it increased somewhat on deposition of metals from the feed. Activity maintenance of Catalyst No. 5 was inferior.

The following examples and their accompanying figures are based on catalysts and testing also reported in the examples of our patent Nos. 4,395,328 and/or 4,399,157.

EXAMPLE III

An embodiment of the process of the present invention wherein the catalyst was employed in the form of an ebullating bed was conducted in a relatively large multi-stage pilot plant. Only the first stage of the unit was employed for the performance of this test.

A large pilot plant batch of catalyst was obtained from the Katalco Corporation. This catalyst, which is identified hereinafter as Catalyst No. 6, was found to contain 4.0 wt% molybdenum trioxide, based upon the weight of the catalyst, supported on a support containing alumina and 8.7 wt% phosphorus calculated as $P_2O_5$ and based upon the weight of the support. Bulk density was about 0.4 g/cc.

A 6,500 cc portion of this catalyst in the form of 0.079 cm (1/32-in) extrudates was charged to the first stage of the pilot plant. Catalyst No. 6 had the properties presented hereinbelow in Table 5.

TABLE 5
PROPERTIES OF CATALYST NO. 6

| PORE VOLUME (cc/gm) | | |
|---|---|---|
| MICROPORES | | 0.98 |
| MACROPORES | | 0.13 |
| TOTAL | | 1.113 |
| BET SURFACE AREA (m²/gm) | | 169 |
| AVERAGE PORE DIAMETER (Å) | | 263 |
| P.V. IN PORES OF RADIUS (Å): | % | cc/g |
| 0–50 | 13.3 | 0.15 |
| 50–100 | 33.2 | 0.37 |
| 100–600 | 41.7 | 0.46 |
| 600–25,000 | 11.8 | 0.13 |

The test was conducted to show the ability of Catalyst No. 6 to demetallize a high-sulfur vacuum residual oil blend, which is identified hereinafter as Feed No. 2. The test was carried out at an inlet pressure of 2,000 psig (13.89 MPa), a catalyst bed temperature of 402° C. (756° F.), a LHSV of 0.6 cc of hydrocarbon per hour per cc of catalyst, and a hydrogen addition rate of about 712 m³/m³ (4,000 SCFB). Samples of product coming from the reactor section were obtained on the eighth day and the twenty-first day of operation. The temperature of operation on the eighth day was 402° C. (756° F.) while the temperature on the twenty-first day was 403° C. (757° F.). The other conditions remained the same. Results of this test are presented hereinbelow in Table 6.

TABLE 6
RESULTS OBTAINED WITH CATALYST NO. 6

| Properties | Feed No. 2 | Sample-Day 8 | Sample-Day 21 |
|---|---|---|---|
| Nickel (ppm) | 56 | 27 | 32 |
| Vanadium (ppm) | 229 | 64 | 83 |
| Sulfur (wt %) | 3.9 | 2.3 | 1.8 |
| Gravity (°API) | 7.3 | 10.4 | 13.0 |
| Rams Carbon (wt %) | 20.7 | 12.8 | 13.6 |

The above data demonstrate effective ebullating bed hydrodemetallation of a high-sulfur, vacuum residual oil.

EXAMPLE IV

This example shows the performance of a catalyst having only a small amount of macropores, i.e., pores having radii within the range of 600–25,000 Å.

A commercial catalyst was obtained from the Katalco Corporation. This catalyst, which is identified hereinafter as Catalyst No. 7, possessed the composition and properties presented hereinbelow in Table 7.

TABLE 7
COMPOSITION AND PROPERTIES OF CATALYST NO. 7

| COMPOSITION (wt %) | | |
|---|---|---|
| $Al_2O_3$ | | 84.0 |
| $P_2O_5$ | | 8.5 |
| $MoO_3$ | | 4.1 |
| $SiO_2$ | | 1.3 |
| $Na_2O$ | | 1.5 |
| $SO_4^{--}$ | | 0.5 |
| BET SURFACE AREA (m²/gm) | | 168 |
| PORE VOLUME (cc/gm) | | |
| 0–600 Å | | 0.9815 |
| 600–25,000 Å | | 0.0380 |
| Total | | 1.0195 |
| CALC. A.P.D. (Å) | | 243 |
| P.V. IN PORES OF RADIUS (Å): | % | cc/g |
| 0–50 | 15.3 | 0.16 |
| 50–100 | 81.0 | 0.83 |
| 100–50,000 | 3.7 | 0.04 |

As indicated in Table 7, the macropore volume of Catalyst No. 7 is less than half of that of the invented catalysts.

Catalyst No. 7 was tested as described hereinabove in Example II under operating conditions similar to those employed in the tests of Example II using the Ardeshir feed described in Table 3. The results of this test are presented in the accompanying FIG. 3. Also shown in FIG. 3 are the results of the test described hereinabove with Catalyst No. 3 of Example II which had 17.3% of its total pore volume, corresponding to 0.19 cc/g, provided by macropores.

Figure 3:
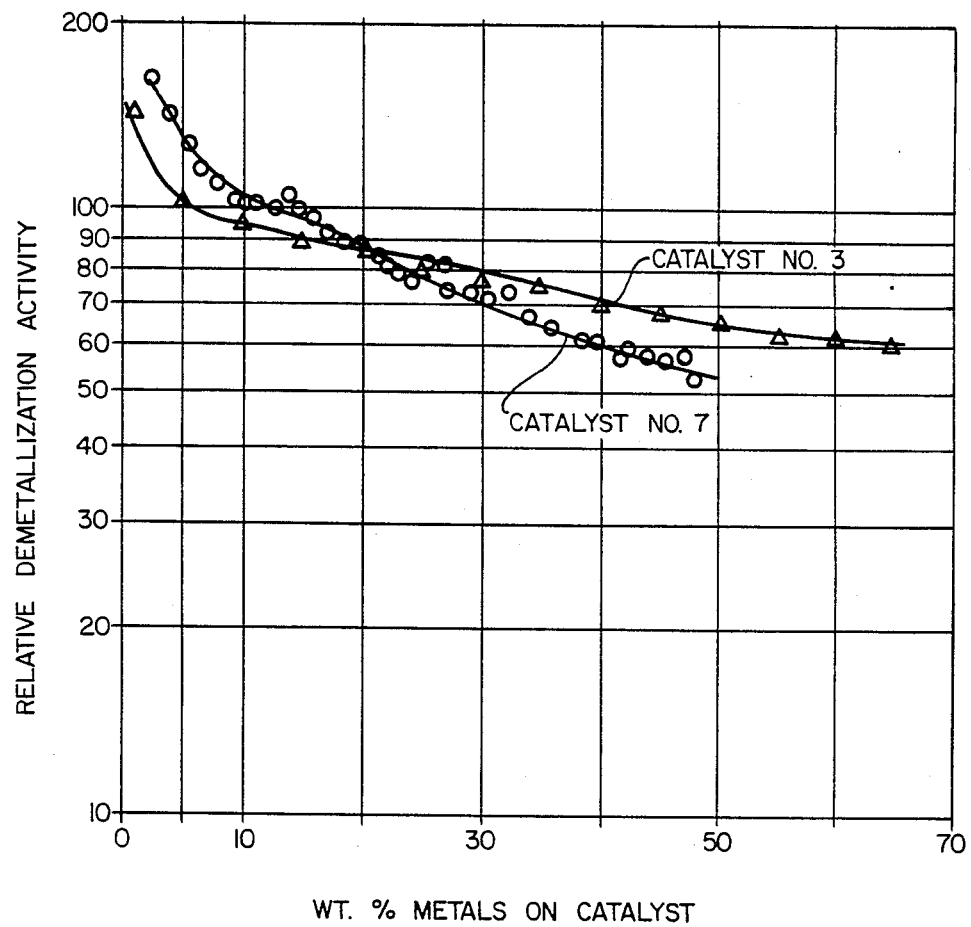

FIG. 3 shows that Catalyst No. 7 had a higher rate of deactivation than did Catalyst No. 3. Hence, Catalyst No. 7, which had only 3.7% of its pore volume in macropores, performed in a manner that was inferior to that of Catalyst No. 3, an embodiment of the catalyst of the present invention. Catalyst No. 3 is an improved catalyst for the demetallization of heavy hydrocarbon streams containing a substantial amount of metals.

EXAMPLE V

An experimental catalyst was prepared for us by the Davison Chemical Division of W. R. Grace and Co. in the form of 0.8 mm (1/32-in) extrudates. This catalyst, identified hereinafter as Catalyst No. 8, was prepared to contain 4 wt% $MoO_3$, based upon the weight of the catalyst, on a support of alumina and 6 wt% silica, based upon the weight of the support. The catalyst support had been steamed according to U.S. Pat. No. 4,399,057.

Catalyst No. 8 was found to have the properties presented hereinbelow in Table 8.

TABLE 8
PROPERTIES OF CATALYST NO. 8

| PORE VOLUME (cc/gm) | | |
|---|---|---|
| MICROPORES | | 0.96 |
| MACROPORES | | 0.15 |
| TOTAL | | 1.108 |
| BET SURFACE AREA (m²/gm) | | 151 |
| CALC. A.P.D. (Å) | | 293 |
| P.V. IN PORES OF RADIUS (Å) | % | cc/g |
| 0–50 | 5.5 | 0.06 |
| 50–100 | 32.2 | 0.36 |
| 100–600 | 48.9 | 0.54 |
| 600–25,000 | 13.4 | 0.15 |
| BULK DENSITY (g/cc) | 0.45 | |

Catalyst No. 8 was tested as described hereinabove in Example II under conditions similar to those employed in Example II using the Ardeshir feed described in Table 3. The results of this test are presented in the accompanying FIG. 4. Also shown in FIG. 4 are the results of the test described hereinabove with Catalyst No. 3 of Example II.

FIG. 4 shows that Catalyst No. 8, having properties in accordance with the present invention, provided performance similar to that of Catalyst No. 3. These data indicate that Catalyst No. 8 is an improved catalyst for the demetallization of heavy hydrocarbon streams containing a substantial amount of metals.

We claim:

1. A process for hydrotreating hydrocarbon feeds comprising contacting a hydrocarbon feed susceptible to upgrading with hydrogen under hydrotreating conditions in the presence of a catalyst comprising a hydrogenating component and a support comprising at least one porous refractory inorganic oxide, said catalyst having a BET surface area of 150 to about 190 m$^2$/g, a micropore volume of about 0.9 to about 1.3 cc/g as determined by nitrogen desorption in micropores having radii up to 600 Å, with at least 0.7 cc/g of such micropore volume in micropores with radii ranging from 50 to 600 Å, a macropore volume of 0.15 to about 0.5 cc/g as determined by mercury penetration in macropores having radii of 600 to 25,000 Å, a total pore volume of about 1.05 to about 1.8 cc/g being the sum of the aforesaid micropore volume and aforesaid macropore volume, and bulk density of about 0.3 to about 0.5 g/cc.

2. The process of claim 1 wherein the hydrocarbon feed comprises a distillate and hydrotreating conditions comprise a pressure of about 300 to about 750 psig (about 21 to about 53 kg/cm$^2$), temperature of about 600° to about 725° F. (about 315° to about 385° C.), hydrogen rate of about 400 to about 1000 SCFB and space velocity of about 2 to about 5 lb hydrocarbon per hour per lb catalyst.

3. The process of claim 1 wherein the hydrocarbon feed comprises a gas oil and hydrotreating conditions comprise a pressure of about 500 to about 1000 psig (about 35 to about 70 kg/cm$^2$), temperature of about 600° to about 750° F. (about 315° to about 399° C.), hydrogen rate of about 800 to about 1600 SCFB and space velocity of about 1 to about 4 lb hydrocarbon per hour per lb catalyst.

4. The process of claim 1 wherein the hydrocarbon feed comprises an atmospheric or vacuum resid and hydrotreating conditions comprise a pressure of about 500 to about 10,000 psig (about 35 to about 703 kg/cm$^2$), temperature of about 600° to about 950° F. (about 315° to about 510° C.), hydrogen rate of about 1000 to about 10,000 SCFB and space velocity of about 0.2 to about 3 lb hydrocarbon per hour per lb. catalyst.

5. The process of claim 1 wherein the hydrogenating component comprises at least one metal selected from the group consisting of the Group VIB metals, the Group VIII metals and vanadium.

6. The process of claim 2 wherein the hydrogenating component comprises molybdenum.

7. The process of claim 2 wherein the hydrogenating component is molybdenum and is present in an amount ranging from about 2.5 to about 15 wt% calculated as MoO$_3$ and based on total catalyst weight.

8. The process of claim 2 wherein the hydrogenating component comprises vanadium.

9. The process of claim 2 wherein the hydrocarbon feed and hydrogen are contacted in a fixed bed of said catalyst.

10. The process of claim 2 wherein the hydrocarbon feed and hydrogen are contacted in an expanded bed of said catalyst.

11. A process for hydrotreating a hydrocarbon comprising high metals and high sulfur content resid comprising contacting said feed with hydrogen under hydrotreating conditions in the presence of a fixed bed of catalyst comprising a hydrogenating component comprising about 3.5 to about 8 wt% MoO$_3$ and about 92 to about 96.5 wt% of a support comprising alumina, phosphated alumina or alumina and silica, said catalyst having a BET surface area of about 150 to about 190 m$^2$/g, a micropore volume of about 0.9 to about 1.3 cc/g as determined by nitrogen desorption in micropores having radii up to 600 Å, with at least about 0.75 cc/g of such micropore volume in micropores having radii of 50 to 600 Å, a macropore volume of about 0.15 to about 0.50 cc/g as determined by mercury penetration in macropores having radii of 600 to 25,000 Å, a total pore volume of about 1.05 to about 1.8 cc/g being the sum of the aforesaid micropore volume and aforesaid macropore volume, and bulk density of about 0.3 to about 0.5 g/cc.

12. A process for hydrotreating a hydrocarbon feed comprising high metals and high sulfur content resid comprising contacting said feed with hydrogen under hydrotreating conditions in an ebullating bed of catalyst comprising a hydrogenating component comprising about 3.5 to about 8 wt% MoO$_3$ and about 92 to about 96.5 wt% of a support comprising alumina, phosphated alumina or alumina and silica, said catalyst having a BET surface area of about 150 to about 190 m$^2$/g, a micropore volume of about 0.9 to about 1.3 cc/g as determined by nitrogen desorption in micropores having radii up to 600 Å with at least 0.75 cc/g of such micropore volume in micropores having radii of 50–600 Å, a macropore volume of about 0.15 to about 0.50 cc/g as determined by mercury penetration in macropores having radii of 600 to 25,000 Å, a total pore volume of about 1.05 to about 1.8 cc/g being the sum of the aforesaid micropore volume and aforesaid macropore volume, and bulk density of about 0.3 to about 0.5 g/cc.

* * * * *

UNITED STATES PATENT OFFICE
CERTIFICATE OF CORRECTION

Patent No. 4,549,957                      Dated   October 29, 1985

Inventor(s)   Albert L. Hensley, Jr. and Leonard M. Quick

It is certified that error appears in the above-identified patent and that said Letters Patent are hereby corrected as shown below:

Column 4, Table 1
Line 66, "pv" should be --% pv--.

Column 4, Table 1, "Approximately    0-25
Line 68         50-100" should be  --Approximately       0-25
                                   $\geq 20^{(1)}$       50-100--

Column 5, Table 1
Line 3    "pv" should be --% pv--

Column 5, Table 1
Line 20   "of pv in R >300" should be --of pv in R <300--

Column 7, line 56   "of even date herewith" should be --on June 17, 1981--

Column 10, line 28/29, "on even date herewith" should be --on June 17, 1981--

Column 10, line 51, "of even date herewith" should be --on June 17, 1981--

Signed and Sealed this

Twenty-ninth  Day of  July 1986

[SEAL]

Attest:

DONALD J. QUIGG

Attesting Officer    Commissioner of Patents and Trademarks